G. ROWLAND.
MACHINE FOR PRESSING GARMENTS.
APPLICATION FILED FEB. 18, 1911.
Reissued Mar. 21, 1916.
14,090.
3 SHEETS—SHEET 1.
Fig. 1.
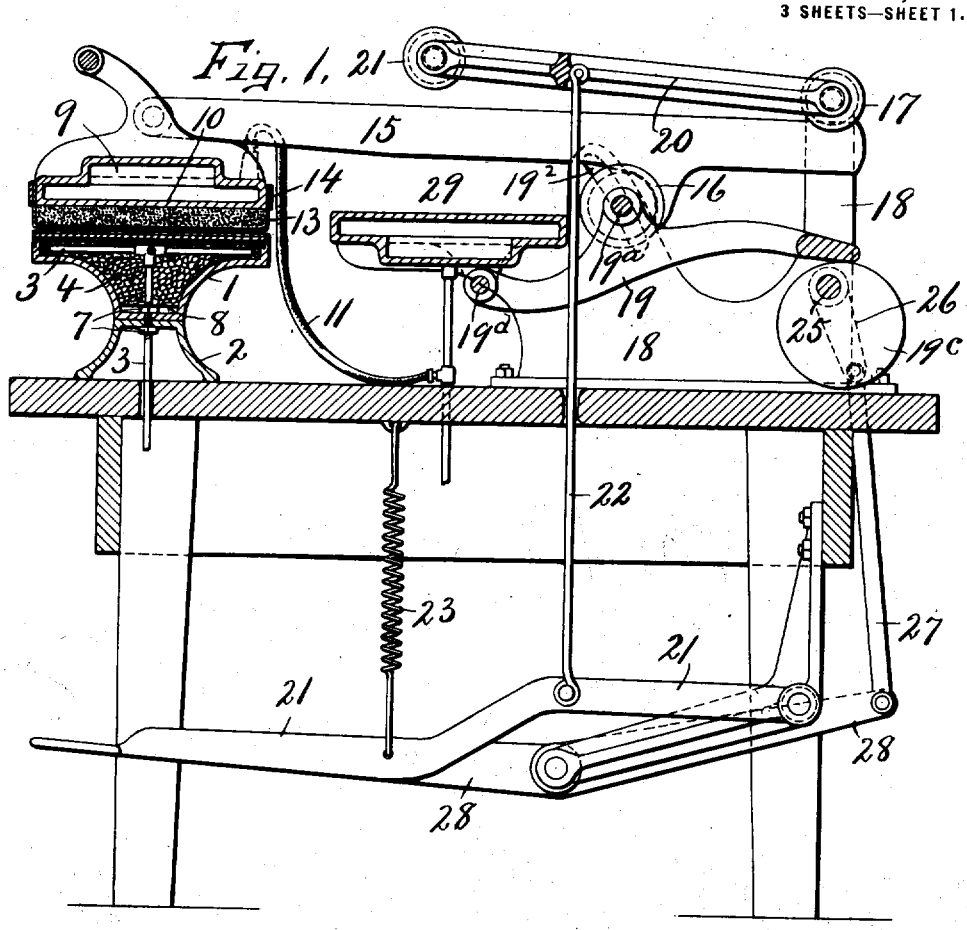
Fig. 3.
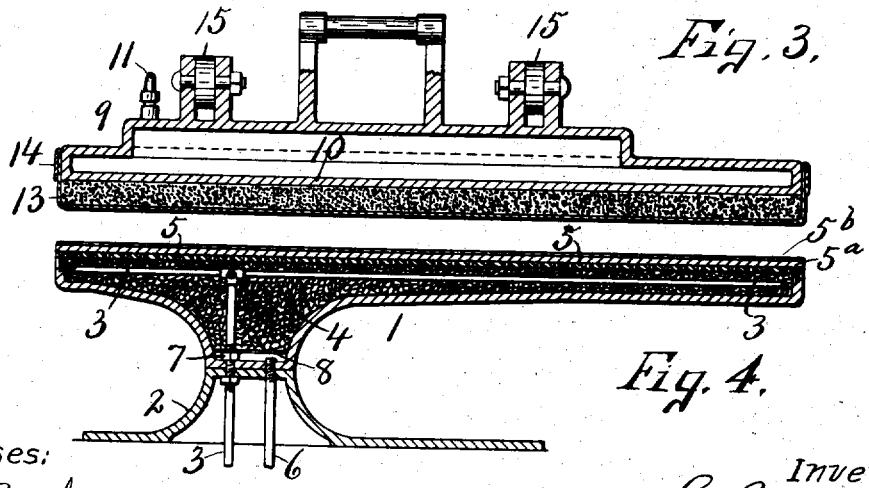
Fig. 4.
Witnesses:
R. W. Bailey.
H. E. Chace
Inventor:
G. Rowland
By
Howard P. Denison
Attorney.

G. ROWLAND.

MACHINE FOR PRESSING GARMENTS.

APPLICATION FILED FEB. 18, 1911.

Reissued Mar. 21, 1916.

14,090.

3 SHEETS—SHEET 2.

Witnesses:
R. W. Bailey.
H. E. Chase

Inventor
G. Rowland
By
Howard P. Denison
Attorney.

G. ROWLAND.

MACHINE FOR PRESSING GARMENTS.

APPLICATION FILED FEB. 18, 1911.

Reissued Mar. 21, 1916.

14,090.

3 SHEETS—SHEET 3.

Witnesses

E. J. Staub

H. E. Chase

Inventor

George Rowland

By Howard P. Denison

Attorney

UNITED STATES PATENT OFFICE.

GEORGE ROWLAND, OF CINCINNATI, OHIO, ASSIGNOR TO T. D. PALMER COMPANY, OF SYRACUSE, NEW YORK, A CORPORATION OF NEW YORK.

MACHINE FOR PRESSING GARMENTS.

14,090. Specification of Reissued Letters Patent. Reissued Mar. 21, 1916.

Original No. 926,291, dated June 29, 1909, Serial No. 377,425. Application for reissue filed February 18, 1911. Serial No. 609,544.

*To all whom it may concern:*

Be it known that I, GEORGE ROWLAND, of Cincinnati, in the county of Hamilton and State of Ohio, have invented certain new and useful Improvements in Machines for Pressing Garments; and I do hereby declare the following to be a full, clear, and exact description of the invention, such as will enable others skilled in the art to which it appertains to make and use the same.

My invention relates to a machine for pressing made up garments, the object being to provide a device of this character that will press the garment without any danger whatsoever of scorching or glazing same, and which will conform itself to and press evenly upon irregular surfaces such as pockets, bindings, or braid, thus leaving the applied work standing out more clearly and freely from the body of the goods.

The main object is to subject the garment to the simultaneous application of direct mechanical and steam pressure in which the mechanical pressure holding the pressing elements in their pressing position is greater than the steam pressure tending to separate such elements during the pressing and steaming operation.

Another object is to hold the steam back and thereby prevent its too free passage through the garment whereby a steam cushion is formed between the perforated plate and garment to prevent saturation of such garment by moisture of condensation during the pressing operation.

A further object is to apply the steam directly to one surface only of the garment while under mechanical pressure whereby the adjacent nap is quickly softened and restored without saturating the entire garment.

With these ends in view my invention consists in the parts and combinations of parts as will be more fully described and pointed out in the claims.

Figure 2:
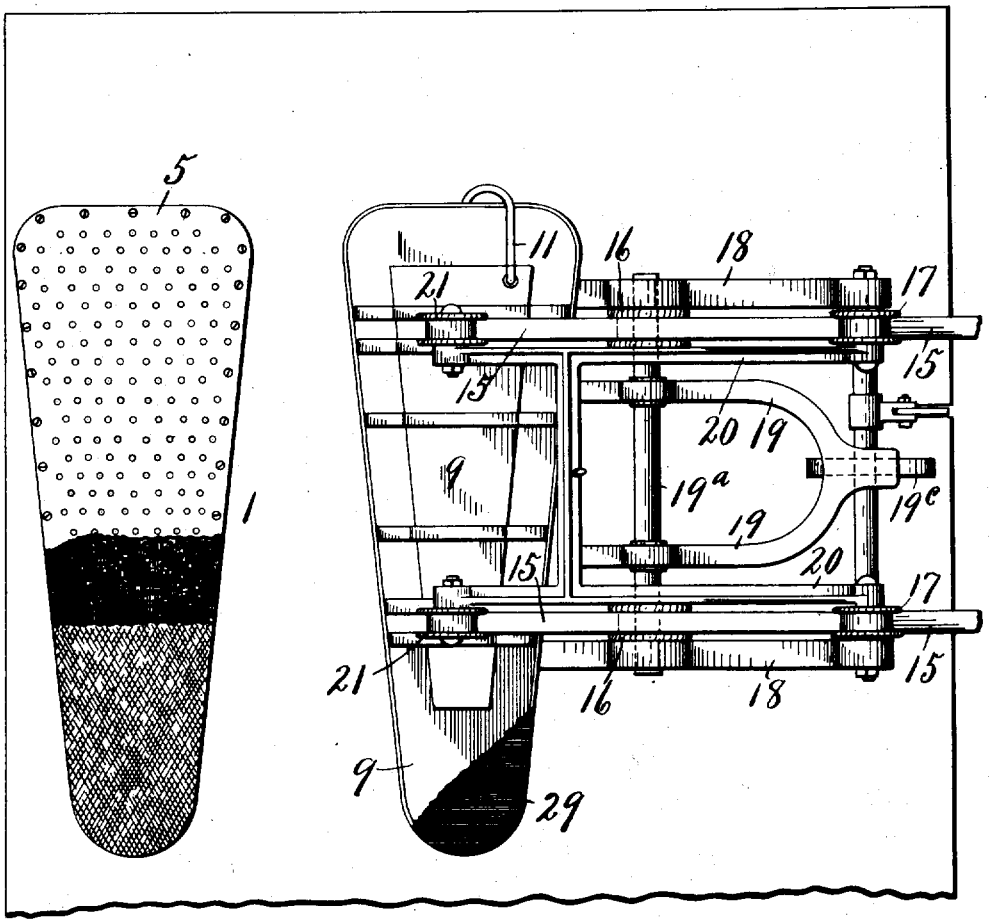
Figure 5:
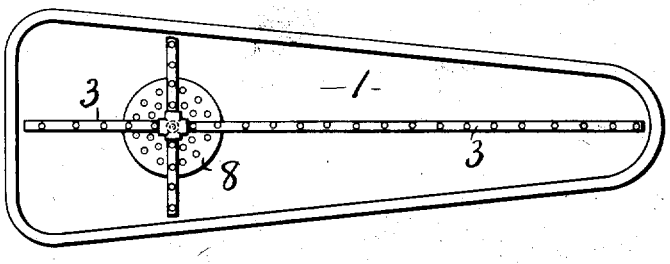
Figure 6:
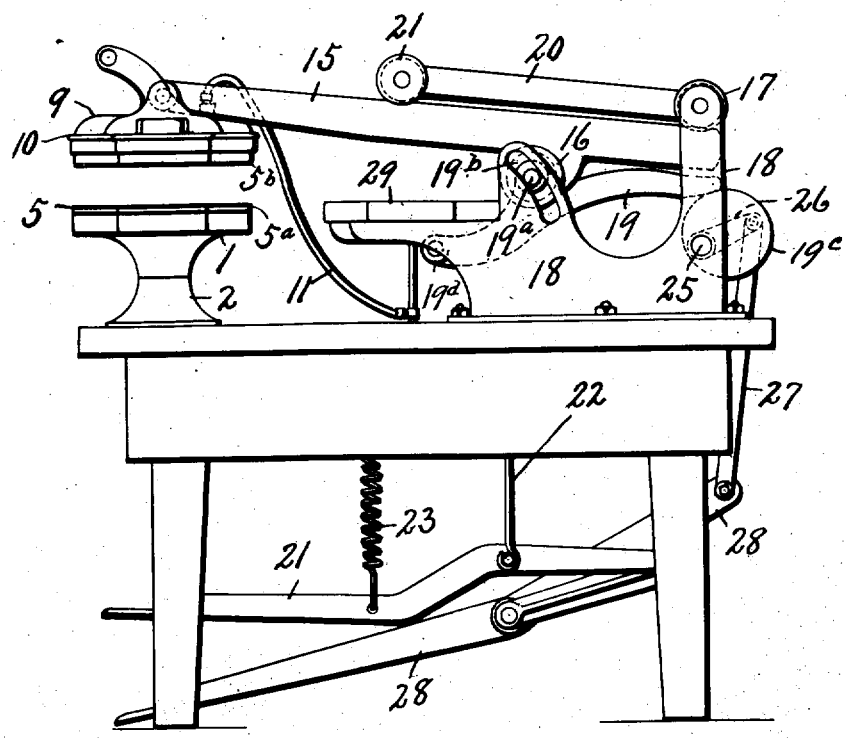

In the accompanying drawings, Figure 1 is a sectional view of my improvements showing the top in position on the steam table. Fig. 2 is a plan view showing the top moved to the rear of the steam table. Fig. 3 is a view in section of the top. Fig. 4 is a view in section of the steam table, and Fig. 5 is a plan view of the steam table with the top removed. Fig. 6 is a side elevation of the machine showing the upper press head as elevated preparatory to sliding the same rearwardly to the heating plate.

1 represents the steam table or buck of a tailor's pressing stand. This table is preferably supported on a casting 2 secured to the bench and to the underside of the steam table. This casting 2 is so shaped and is of such size that the ends and sides of the steam table overhang or project beyond the same in the manner common to the ordinary pressing stand used by tailors.

The steam table is hollow to form a steam chamber and its upper face 5 is composed of sheet brass, or other non-oxidizable metal perforated and secured by screws or other means to the frame of the table as shown in Figs. 2 and 4.

A steam pipe 3 passes up through the casting 2 into the steam table and is branched and perforated within the table so as to discharge the steam evenly throughout the length of the table. The interior of the steam table is filled to a point above the steam pipe with gravel or equivalent material 4 which operates to more evenly distribute the steam throughout the entire surface of the steam table, and also takes up the condensation, thus avoiding the moisture that would otherwise escape through the perforations, and which is one objection to the ordinary steam finishing table now in use.

The perforated top 5 of the table is covered, first with a wool blanket $5^a$, and then with a cotton or flannel cloth $5^b$, which acts as a cushion and protects the garment from the raw steam, the fabric covering, when in operation containing sufficient moisture to dampen the garment while being finished or pressed.

6 is an exhaust pipe through which the steam and water pass from the interior of the table. This pipe 6, together with the steam inlet pipe 3, is suitably secured to the casting 2, the inlet pipe being preferably secured by lock nuts 7. The exhaust pipe is shielded and protected from the gravel 4, by the metal screen 8 upon which the gravel rests.

A presser or press head 9 conforms in shape and outline to the steam table and comprises a hollow structure, having an imperforate bottom or press plate 10 which is made of metal, and if desired the entire body of the presser may be of metal, and is supplied with steam through the flexible hose 11.

Secured against the under or working face of the presser 9, is a bag 13 filled with sand or equivalent heat retaining material. This bag conforms in size and shape to the presser, and is secured thereto by a band 14 preferably of steel engaging a lip or flange of the bag, the said lip or flange being continuous around the body of the presser.

The presser 9 is hinged to or pivotally mounted on the free ends of the arms 15 and the latter are mounted to slide between grooved rollers 16 carried by a pivoted frame 19 and grooved rollers 17, journaled in uprights 18.

Mounted on the supports for the rollers 17 is the swinging frame 20, carrying at its free end, the grooved rollers 21 adapted to be forced down upon the upper surfaces of the arms 15 and force the presser 9 down onto the garments to be pressed. This frame 20 is connected with a foot lever 21 by means of a stiff rod 22, and is held in its elevated position by a spring 23.

The frame 20 is normally disposed with its rollers 21 out of contact with the arms 15, and pressure is applied to the latter and to the presser 9 by means of the foot lever or treadle 21.

The frame 19 is pivotally connected at its front end on the shaft, $19^d$, which is supported in suitable lugs on the underside of a heating plate, 29, and carries a shaft $19^a$ having the grooved rollers 16 thereon, the ends of the shaft resting in curved slots $19^b$ in the uprights 18 said slots being concentric with the shaft —$19^d$— to permit movement of the shaft $19^a$ as the frame 19 is raised and lowered. The rear free end of frame 19 rests upon a cam $19^c$ secured to a shaft 25 mounted in the uprights 18. This shaft is provided with a crank 26 connected by pitman 27 with a foot lever or treadle 28 which, when depressed, turns the shaft and elevates the rear end of frame 19 and also elevates the front ends of the arms 15 carrying the presser 9.

When the presser 9 is elevated it may be moved rearwardly toward a hot plate or baker 29 carried by the uprights 18. This hot plate or baker 29 is in the form of a chamber heated by steam, electricity or gas, and is used for heavy pressure, and also serves as a seat or rest for the presser and retains the sand bag in proper shape and condition for effective and quick pressing.

When the apparatus is in use, it is first heated by admitting steam to both parts thereof, and the garment is placed in its proper position for pressing, on the steam table. The presser is then lowered and the necessary pressure applied. The hot sand bag pressing upon the garment, does not glaze or shine the fabric, as does the ordinary hot plate or tailor's iron, and owing to its yielding qualities, conforms to any irregular surfaces, such as seams, buttons, pockets or braid, thus leaving the applied or projecting parts standing out freely and prominently.

This apparatus is particularly designed for use by manufacturers of ready made garments, dyeing and cleaning works, and for spongers and pressers of made up garments, the object being to enable a single operator to accomplish in a specified time the work of several operators using appliances such as heretofore employed and to leave the goods in better condition than hand pressed work.

By perforating the face plate of the steam table, the escaping steam moistens the cloth, thus loosening up the garment and putting it into a condition where it can be readily shaped upon the table, before the presser is applied. Again by using steam, the passage of the latter through or into contact with the fabric in addition to raising the nap and brightening the fabric, also destroys any germs therein.

It is evident that changes in the construction and relative arrangement of the several parts might be made without avoiding my invention and hence I would have it understood that I do not restrict myself to the particular construction and arrangement of parts shown and described.

Having fully described my invention, what I claim as new and desire to secure by Letters-Patent is:—

1. In a garment pressing machine, the combination with a table and means for heating same, of a presser, means for heating same, and a sand bag secured against the lower or working face of the presser and adapted to rest in contact with the garment on the table.

2. In a garment pressing machine, the combination with a table and means for heating same, of a hinged presser, means for heating same, and a sand bag covering the lower face of the hinged presser.

3. In a garment pressing machine, the combination with a hollow table, a filling of gravel therefor, and a pipe for admitting steam to the interior of the table below the top surface of the gravel, of a hollow presser, means for admitting steam thereto, and a flexible bag secured to said presser and filled with sand.

4. In a garment pressing machine, the combination with a hollow table having a perforated top plate, and means for heating the latter, of a hollow presser, means for heating the same, and a bag containing comminuted heat retaining material secured over the lower or working face of the presser, substantially as set forth.

5. In a garment pressing machine, the combination with a hollow table, a screen therein, a filling of gravel in said table supported on the screen and a pipe discharging steam within the table below the surface of the gravel, of an exhaust pipe leading from the table below the screen.

6. In a garment pressing machine, the combination with a hollow table having a perforated top, means for admitting steam to the interior of said table and a fabric cover secured over the perforated top, of a presser, means for heating same, and a bag or fabric casing secured over the lower face of said cover and filled with comminuted heat retaining material.

7. In a garment pressing machine, the combination with a hollow table having a perforated top, and steam inlet and outlet pipes, of a presser, means for heating same, a fabric casing covering the working or lower face of said presser, sand contained within said casing, and a metal band securing said fabric casing to the presser.

8. In an ironing machine, the combination with supporting means, and a table, of longitudinally movable arms, a presser carried by said arms, a pivoted frame engaging said arms, means for tilting said frame to raise the presser carried by the longitudinally movable arms, a super-imposed pivoted frame, and means for operating the latter to apply pressure to said arms and the presser carried thereby.

9. In an ironing machine, the combination with supporting means, and a table, of longitudinally movable arms, a presser carried thereby, guide rollers for said arms, a pivoted frame for raising said arms and presser, a cam for raising said frame, a treadle for operating said cam, a superimposed pivoted frame for engaging said arms to apply pressure to the presser, and a treadle for operating said superimposed frame.

10. In a garment pressing machine, a hollow buck having a perforated top, a means in said buck for spreading the steam, a pad of moisture absorbing material covering said perforated top, a presser having a yielding imperforate bottom movable toward and from and covering substantially the entire area of the buck when in its pressing position, and means including a foot operated lever for forcing the presser to such position.

11. In a garment pressing machine, a hollow buck having a horizontally disposed substantially flat perforated top, a moisture absorbing covering for said perforated top, means for introducing steam under pressure into the buck and through said perforations, a hollow presser having a yielding imperforate bottom of sufficient area to cover the perforated top of the buck when in its pressing position, means for supplying steam to the interior of the presser for heating the same, and means including a foot-lever for forcing the presser to such position.

In testimony whereof, I have signed this specification in the presence of two subscribing witnesses.

GEORGE ROWLAND.

Witnesses:

GEORGE ROWLAND, Jr.,

MARY E. BROWNE.